Patented Sept. 27, 1932

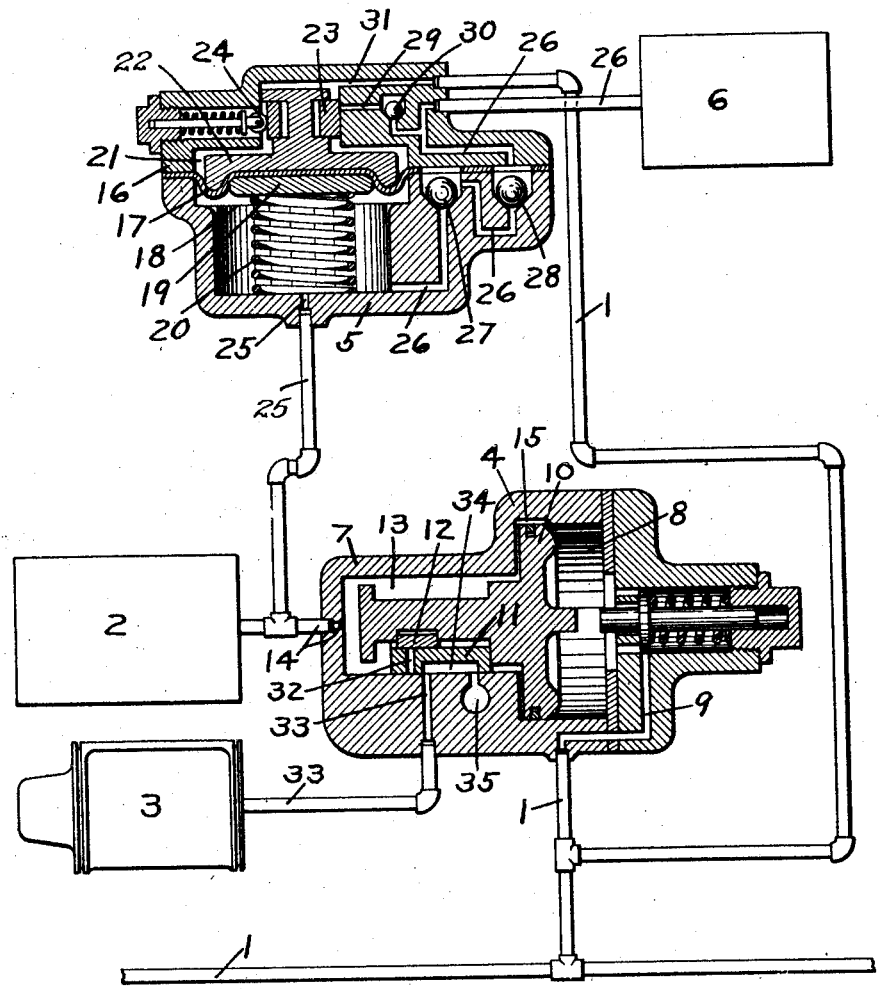

1,879,643

UNITED STATES PATENT OFFICE

THOMAS H. THOMAS, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

QUICK RELEASE DEVICE

Application filed November 20, 1928. Serial No. 320,565.

This invention relates to fluid pressure brakes, and has for one of its objects the provision of novel means for insuring the prompt release of the brakes on a train.

Another object of my invention is to provide a fluid pressure brake equipment having means for insuring the prompt release of the brakes on a train only when said release is intentionally initiated.

Another object of my invention is to provide a fluid pressure brake equipment having means which when applied to the cars of a train will insure the prompt intentional release of the brakes and which, if the brake on one car is unintentionally released, due to excessive leakage, will not cause the releasing action to be propagated throughout the train.

A further object of my invention is to provide a fluid pressure brake equipment having means operated, independently of the usual triple valve, upon a predetermined increase in brake pipe pressure, in releasing the brakes, to supply fluid under pressure to the brake pipe from an additional source or sources to increase the brake pipe pressure to propagate a prompt serial releasing action of the triple valves throughout the train.

Other objects and advantages will appear from the following more detailed description of the invention.

In the accompanying drawing, the single figure is a diagrammatic view, mainly in section, of a fluid pressure brake equipment embodying my invention.

As shown in the drawing, the fluid pressure brake equipment may comprise a brake pipe 1, an auxiliary reservoir 2, a brake cylinder 3, a triple valve device 4, a quick release valve device 5, and a fluid pressure supply source which, in the present embodiment of the invention, is in the form of a reservoir 6.

The triple valve device 4 may be of any desired construction and as shown in the drawing may comprise the usual casing 7 having a piston chamber 8 connected to the brake pipe 1 through a passage 9 and containing a piston 10 which is adapted to operate a main slide valve 11 and a graduating slide valve 12 contained in a valve chamber 13 connected with the auxiliary reservoir 2 through a passage and pipe 14 and to the piston chamber 8 through the usual feed groove 15.

The quick release valve device 5 may comprise a casing 16 having mounted therein a flexible diaphragm 17. Contained in a chamber 18 at one side of this diaphragm is a follower 19 which is maintained in engagement with the diaphragm by the pressure of a spring 20 also contained in the chamber 18. Contained in a chamber 21 at the other side of the diaphragm is a follower member 22 which engages the flexible diaphragm and is adapted to operate a slide valve 23 also contained in the chamber 21, said slide valve being maintained against the slide valve seat on the casing by a spring pressed roller 24 which engages the back surface of the valve.

The chamber 18 of the valve device 5 is connected to the auxiliary reservoir 2 through pipe 14 and a pipe and passage 25, and is also connected to the reservoir 6 through a passage and pipe 26. Interposed in the passage 26 are ball check valves 27 and 28 which are adapted to prevent the back flow of fluid under pressure from the reservoir 6 to the chamber 18 of the valve device 5, auxiliary reservoir 2 and connected valve chamber 13 of the triple valve device 4 as will hereinafter more fully appear.

Leading from the passage 26 to the seat for the slide valve 23, of the valve device 5, is a passage 29 having interposed therein a ball check valve 30 adapted to permit the flow of fluid under pressure from the reservoir 6 through the passage 29 and prevent the back flow of fluid through this passage.

The chamber 21 of the quick release valve device is connected to the brake pipe 1 through a passage 31.

In initially charging the equipment, fluid under pressure supplied to the brake pipe 1, flows to the auxiliary reservoir 2 by way of passage 9 in the triple valve device 4, piston chamber 8, feed groove 15, valve chamber 13 and passage and pipe 14. From the pipe 14 fluid under pressure also flows to the reservoir 6 by way of pipe and passage 25 in the valve device 5, diaphragm chamber 18, passage 26, past the ball check valves 27 and 28 and through pipe 26. From the passage 26, intermediate the pipe 26 and ball check valve 28, fluid under pressure flows to the seat of the slide valve 23 by way of passage 29 past the ball check valve 30. From the brake pipe 1 fluid under pressure also flows to the diaphragm chamber 21 of the valve device 5 through passage 31.

With the equipment fully charged, the pressure of fluid in the diaphragm chambers 18 and 21, in the valve device 5, will be equal, so that the spring urged follower 19 will maintain the flexible diaphragm 17 and follower member 22 in such positions that the slide valve 23 will maintain closed the communication of the reservoir 6 with the diaphragm chamber 21 through passage 29.

In effecting an application of the brakes, the pressure of fluid in the brake pipe may be reduced in the usual manner, which results in the reduction in the pressure of fluid in the piston chamber 8 of the triple valve device 4, so that fluid at auxiliary reservoir pressure in the valve chamber 13, acting on one side of the piston 10, causes said piston to move toward the right hand to application position, in which, communication through the feed groove 15 is closed. When the piston 10 is thus moved toward application position it first operates the graduating slide valve 12 to uncover a port 32 in the main slide valve 11 and then operates the main slide valve 11 to application position, in which fluid under pressure in valve chamber 13 is supplied to the brake cylinder 3 by way of port 32 and passage and pipe 33.

In effecting an application of the brakes, the pressure of fluid in the brake pipe 1 and the pressure of fluid in the auxiliary reservoir 2 will reduce to substantially the same degree, so that the pressures in the diaphragm chambers 18 and 21 of the valve device 5 will be substantially equal, and due to this, the pressure of the spring 20 will maintain the slide valve 23 in position, closing the passage 29. When the auxiliary reservoir pressure is reduced, the check valves 27 and 28 are seated, so that fluid in the reservoir 6, which is at a higher pressure than the fluid in the auxiliary reservoir, will not be permitted to reduce into the auxiliary reservoir.

To release the brakes, the brake pipe pressure is increased in the usual manner, and this increased pressure, present in the triple valve piston chamber 8, acting on one side of the piston 10, causes said piston to move to its release position against auxiliary reservoir pressure in valve chamber 13 acting on the other side of the piston. Since the slide valves 11 and 12 are operated by the piston 10, the brake cylinder 3 is vented to the atmosphere by way of pipe and passage 33, a cavity 34 in the main slide valve 11 and atmospheric passage 35. With the piston 10 in release position, communication from the piston chamber 8 to the valve chamber 13 through the feed groove 15 is reestablished, so that the auxiliary reservoir pressure will again start to build up.

Since the flow of fluid under pressure from the brake pipe 1 to the triple valve piston chamber 8 and to the diaphragm chamber 21 in the valve device 5 is unrestricted and the flow of fluid to the auxiliary reservoir and diaphragm chamber 18 is restricted by the size of the feed groove 15, the pressure in chamber 21 will build up at a faster rate than will the pressure in chamber 18. When the pressure in chamber 21 acting on one side of the flexible diaphragm 17 is sufficient to overcome the pressure of the spring 20 and the pressure of fluid in chamber 18 acting on the other side of the diaphragm 17, said diaphragm, together with the follower member 22 and slide valve 23, will move downwardly to a position in which the slide valve 23 will uncover the passage 29.

With the passage 29 thus uncovered, fluid under pressure from the reservoir 6 is supplied to the brake pipe 1 by way of pipe and passage 26, past the ball check valve 30, passage 29, diaphragm chamber 21 and passage 31, thus rapidly increasing the brake pipe pressure, which acts to hasten the releasing action of the triple valve device on the next succeeding car, as well as hasten the action of the quick release valve device on this car to further supply fluid from its reservoir 6 to the brake pipe.

It will thus be seen that as each reservoir 6 is discharged in succession into the brake pipe, the pressure in the brake pipe is rapidly increased throughout the train, so that the triple valve devices will operate promptly to release positions, thereby effecting a rapid release of the brakes throughout the train.

With the slide valve 23 of the valve device 5 in the position uncovering the passage 29, fluid flows from the reservoirs 6 to the brake pipe 1 until the brake pipe pressure and the reservoir pressure are equal, when the ball check valve 30 seats. Now when the brake pipe pressure exceeds the pressure in the reservoir, fluid under pressure from the brake pipe cannot flow to the reservoir 6 due to the ball check valve 30 being seated, thus preventing the retardation of the build up in brake pipe pressure. Were it not for the ball check valve 30, the reservoirs 6 would be recharged directly from the brake pipe and thus retard the action of the triple valve devices and slow up the release of the brakes.

When the pressures of fluid supplied to the diaphragm chambers 18 and 21 in the valve device 5 equalize, the pressure of the spring 20 acting on the follower 19, diaphragm 17 and follower member 22, causes these parts to operate to move the slide valve 23 to its upper position in which it laps the passage 29, closing off the flow of fluid therethrough.

The reservoir 6 is recharged with fluid under pressure from the brake pipe as hereinbefore described.

I desire to have the valve device 5 operate, to supply fluid under pressure to the brake pipe 1, at a higher pressure differential than is required to shift the triple valve 4 from application position to release position, so that if there should be a leakage of fluid under pressure from the auxiliary reservoir sufficient to permit the triple valve to move to release position, the valve device will not operate to supply fluid under pressure to the brake pipe and thereby propagate an unintentional releasing action of the other triple valve device on the train. This higher pressure differential may be governed by the force of the spring 20.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. In a fluid pressure brake, the combination with a brake pipe, of means operative by a pretermined fluid pressure differential for releasing the brakes, and means operative by a greater fluid pressure differential for increasing the pressure of fluid in said brake pipe in releasing the brakes.

2. In a fluid pressure brake, the combination with a brake pipe, of means operative to release the brakes upon a predetermined increase in brake pipe pressure, and means operative upon a greater increase in brake pipe pressure to increase the pressure of fluid in said brake pipe.

3. In a fluid pressure brake, the combination with a brake pipe, of a valve device operative by fluid under pressure from said brake pipe for releasing the brakes, and a valve device operative by fluid under pressure from said brake pipe for supplying fluid under pressure to said brake pipe.

4. In a fluid pressure brake, the combination with a brake pipe, of a triple valve device operative upon a predetermined increase in brake pipe pressure to release the brakes, a reservoir normally charged with fluid under pressure, and a valve device operative upon a predetermined greater increase in brake pipe pressure for establishing communication from said reservoir to the brake pipe.

5. In a fluid pressure brake, the combination with a brake pipe and an auxiliary reservoir, of a triple valve device operative upon an increase in brake pipe pressure for releasing the brakes, and means subject to the opposing pressures of said auxiliary reservoir and brake pipe in releasing the brakes for establishing communication through which the pressure of fluid in said brake pipe is increased.

6. In a fluid pressure brake, the combination with a brake pipe and an auxiliary reservoir, of a triple valve device operative upon an increase in brake pipe pressure for releasing the brakes, a supplemental reservoir normally charged with fluid under pressure from the brake pipe, and means subject to the opposing pressures of said auxiliary reservoir and the brake pipe for supplying fluid under pressure from said supplemental reservoir to said brake pipe in releasing the brakes.

7. In a fluid pressure brake, the combination with a brake pipe and an auxiliary reservoir, of a triple valve device operative upon a reduction in brake pipe pressure for effecting an application of the brakes and operative upon an increase in brake pipe pressure for releasing the brakes, a supplemental reservoir, and means subject to the opposing pressures of the auxiliary reservoir and brake pipe for establishing communication from said supplemental reservoir to the brake pipe in releasing the brakes and for controlling the closing of said communication in effecting an application of the brakes.

8. In a fluid pressure brake, the combination with a brake pipe and an auxiliary reservoir, of a triple valve device subject to the opposing pressures of fluid in said auxiliary reservoir and brake pipe for effecting the application and release of the brakes, a supplemental reservoir for supplying fluid under pressure to said brake pipe in releasing the brakes, and means subject to the opposing pressures of the auxiliary reservoir and brake pipe for controlling the connection of said supplemental reservoir to said brake pipe.

9. In a fluid pressure brake, the combination with a brake pipe and an auxiliary reservoir, of a valve device subject to the opposing pressures of said auxiliary reservoir and brake pipe for controlling the application and release of the brakes, a fluid pressure supply source, and means subject to the opposing pressures of said brake pipe and auxiliary reservoir for supplying fluid under pressure from said fluid pressure supply source to said brake pipe in releasing the brakes.

10. In a fluid pressure brake, the combination with a brake pipe and an auxiliary reservoir, of a valve device subject to the opposing pressures of said auxiliary reservoir and brake pipe for controlling the application and release of the brakes, a fluid pressure supply source, a valve operative to supply fluid under pressure from said source to said brake pipe in releasing the brakes, and means subject to the opposing pressures of the brake pipe and auxiliary reservoir for operating said valve.

11. In a fluid pressure brake, the combination with a brake pipe, of a triple valve device subject to a predetermined brake pipe pressure for releasing the brakes, a reservoir, and means subject to a higher brake pipe pressure than that required to operate said triple valve device for establishing communication from said reservoir to the brake pipe in releasing the brakes.

12. In a fluid pressure brake, the combination with a brake pipe, of a triple valve device subject to a predetermined brake pipe pressure for releasing the brakes, a reservoir, means subject to a higher brake pipe pressure than that required to operate said triple valve device for establishing communication from said reservoir to the brake pipe in releasing the brakes, and means adapted to prevent the flow of fluid through said communication from said brake pipe to said reservoir.

13. In a fluid pressure brake, the combination with a brake pipe, of a triple valve device subject to a predetermined brake pipe pressure for releasing the brakes, a reservoir, means subject to a higher brake pipe pressure than that required to operate said triple valve device for establishing communication from said reservoir to the brake pipe in releasing the brakes, and a check valve adapted to prevent the flow of fluid under pressure through said communication from said brake pipe to said reservoir.

14. In a fluid pressure brake, the combination with a brake pipe, of a triple valve device subject to a predetermined brake pipe pressure for releasing the brakes, a reservoir, means subject to a higher brake pipe pressure than that required to operate said triple valve device for establishing communication from said reservoir to the brake pipe in releasing the brakes, and means for closing said communication when the pressure of fluid in said brake pipe is higher than the pressure of fluid in said reservoir to prevent the flow of fluid through said communication from said brake pipe to said reservoir.

15. In a fluid pressure brake, the combination with a brake pipe, of a triple valve device subject to a predetermined brake pipe pressure for releasing the brakes, a reservoir, means subject to a higher brake pipe pressure than that required to operate said triple valve device for establishing communication through which fluid under pressure is supplied from said reservoir to the brake pipe in releasing the brakes, and means for preventing the recharging of said reservoir from the brake pipe through said communication.

16. A fluid pressure brake system comprising a brake pipe, a brake cylinder, an auxiliary reservoir, a triple valve device, a supplemental reservoir and a valve device operative independently of said triple valve device in releasing the brakes by fluid under pressure from said brake pipe for controlling communication between the supplemental reservoir and brake pipe.

17. In a fluid pressure brake, the combination with a brake pipe, a brake cylinder, auxiliary reservoir and a supplemental reservoir, of a triple valve device operative upon an increase in brake pipe pressure to establish communication from said brake pipe to said reservoirs, a valve operative to prevent the back flow of fluid from said supplemental reservoir to said auxiliary reservoir, means subject to the opposing pressures of said auxiliary reservoir and said brake pipe in releasing the brakes for establishing communication through which fluid under pressure is supplied to said brake pipe, and a valve operative to prevent the flow of fluid through said communication from said brake pipe to said supplemental reservoir when the pressure in said brake pipe is greater than the pressure in said supplemental reservoir.

18. In a fluid pressure brake, the combination with a brake pipe, a brake cylinder, an auxiliary reservoir, and a supplemental reservoir, of a triple valve device adapted in release position to establish communication through which fluid under pressure is supplied to both of said reservoirs, a valve adapted to prevent the back flow of fluid under pressure from said supplemental reservoir to said auxiliary reservoir, a valve device operative upon a predetermined increase in brake pipe pressure in releasing the brakes for establishing communication through which fluid under pressure is supplied from said supplemental reservoir to said brake pipe, and means for closing said communication against back flow of fluid from said brake pipe to said supplemental reservoir.

19. In a fluid pressure brake, the combination with a brake pipe and an auxiliary reservoir, of a supplemental reservoir, means for charging the auxiliary reservoir with fluid under pressure from the brake pipe, means for charging the supplemental reservoir from the auxiliary reservoir, and means operated upon an increase in brake pipe pressure for supplying fluid under pressure from the supplemental reservoir to the brake pipe.

20. In a fluid pressure brake, the combination with a brake pipe and an auxiliary reservoir, of a supplemental reservoir, means for charging the auxiliary reservoir with fluid under pressure from the brake pipe, means for charging the supplemental reservoir from the auxiliary reservoir, a spring, and means subject on one side to the auxiliary reservoir pressure and the pressure of said spring and on the opposite side to brake pipe pressure for controlling the supply of fluid from the supplemental reservoir to the brake pipe.

In testimony whereof I have hereunto set my hand, this 16th day of November, 1928.

THOMAS H. THOMAS.